US012446001B2

(12) United States Patent
Niu et al.

(10) Patent No.: US 12,446,001 B2
(45) Date of Patent: Oct. 14, 2025

(54) METHOD, DEVICE, AND SYSTEM FOR PAGING AND TRANSMITTING UE IDENTITIES IN WIRELESS NETWORKS

(71) Applicant: ZTE Corporation, Shenzhen (CN)

(72) Inventors: Li Niu, Shenzhen (CN); Xiubin Sha, Shenzhen (CN); Bo Dai, Shenzhen (CN); Ting Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 400 days.

(21) Appl. No.: 18/082,233

(22) Filed: Dec. 15, 2022

(65) Prior Publication Data

US 2023/0119167 A1    Apr. 20, 2023

Related U.S. Application Data

(63) Continuation of application No. PCT/CN2020/107921, filed on Aug. 7, 2020.

(51) Int. Cl.
*H04W 68/02* (2009.01)
*H04W 76/28* (2018.01)
*H04W 88/08* (2009.01)

(52) U.S. Cl.
CPC .......... *H04W 68/02* (2013.01); *H04W 76/28* (2018.02); *H04W 88/085* (2013.01)

(58) Field of Classification Search
CPC ... H04W 68/005; H04W 68/02; H04W 76/28; H04W 88/085; H04W 8/26; H04W 92/045; H04W 92/12; H04W 92/20; Y02D 30/70
USPC ....................................................... 455/458
See application file for complete search history.

(56) References Cited

U.S. PATENT DOCUMENTS

| 2018/0084524 | A1* | 3/2018 | Pradas | H04W 68/02 |
| 2018/0302878 | A1* | 10/2018 | Byun | H04W 88/16 |
| 2020/0280919 | A1* | 9/2020 | Hoglund | H04W 76/28 |
| 2021/0337507 | A1* | 10/2021 | Selvaganapathy | H04W 68/02 |

(Continued)

FOREIGN PATENT DOCUMENTS

| CN | 109151997 A | 1/2019 |
| EP | 3 641 427 A1 | 4/2020 |

(Continued)

OTHER PUBLICATIONS

Communication Pursuant to Article 94(3) EPC issued in European Patent Application No. 20947918.7 dated Oct. 21, 2024, 7 pages.

(Continued)

*Primary Examiner* — Hirdepal Singh
(74) *Attorney, Agent, or Firm* — Crowell & Moring LLP

(57) ABSTRACT

This disclosure above describes a method and system for reliably delivering and receiving paging message and reducing power consumption. The method includes: sending, by a first network element of a wireless communication network, a first paging message targeting a UE and comprising a first set of paging parameters to a second network element of the wireless communication network; identifying, by the first network element, a paging failure condition associated with the first paging message; and sending, by the first network element, upon the identification of the paging failure condition, a second paging message targeting the UE and comprising a second set of paging parameters different from the first set of paging parameters to the second network element.

16 Claims, 8 Drawing Sheets

(56) References Cited

U.S. PATENT DOCUMENTS

| | | | | |
|---|---|---|---|---|
| 2022/0078872 A1* | 3/2022 | Shrestha | ............... | H04W 76/30 |
| 2022/0174583 A1* | 6/2022 | Yang | ..................... | H04W 68/12 |
| 2023/0276387 A1* | 8/2023 | Laselva | ................. | H04W 68/02 |
| | | | | 370/503 |

FOREIGN PATENT DOCUMENTS

| WO | WO 2020/088618 A1 | 5/2002 |
|---|---|---|
| WO | WO 2019/157758 A1 | 8/2019 |
| WO | WO 2022/077315 A1 | 4/2022 |
| WO | WO 2022/188751 A1 | 9/2022 |

OTHER PUBLICATIONS

Chinese Office Action with English Translation for Chinese Patent Application No. 202310709793.3 dated Sep. 25, 2023, 8 pages.

International Search Report and Written Opinion for International Patent Application No. PCT/CN2020/107921 dated May 7, 2021, 9 pages.

3GPP TS 38.473 v16.2.0 (Jul. 2020), 3rd Generation Partnership Project; Technical Specification Group Radio Access Network; NG-RAN; F1 application protocol (F1AP), Release 16, 363 pages.

3GPP TS 38.413 v16.2.0 (Jul. 2020), 3rd Generation Partnership Project; Technical Specification Group Radio Access Network; NG-RAN; NG Application Protocol NGAP , Release 16, 462 pages.

ZTE, "Report on Offline Discussions on CB: # 94_Rel-15_ WUS" 3GPP TSG-RAN WG3 #107bis-e, R3-202564, Apr. 30, 2020 (Apr. 30, 2020), 7 pages.

Extended European Search Report issued in related European Patent No. 20947918.7 dated Dec. 20, 2023, 16 pages.

ZTE, "pCR38473 for Support of extended DRX in CM-IDLE for NBIoT/eMTC connected to 5GC", 3GPP draft R3-192305, 3GPP vol. RAN WG3 #104 Reno, Nevada, USA; May 13, 2019-May 17, 2019, May 1, 2019, 7 pages.

Huawei; "Paging delivery over F1", 3GPP draft R3-173102, 3GPP vol. RAN WG3 #97 Berlin, Germany; Aug. 21, 2017-Aug. 25, 2017 21, Aug. 21, 2017, 3 pages.

Qualcomm Incorporated, "Support of paging in F1", 3GPP draft R3-173266, 3GPP vol. RAN WG3 #97. Berlin, Germany; Aug. 21, 2017-Aug. 25, 2017 21, Aug. 21, 2017, 3 pages.

Chinese Office Action with English translation, Dec. 15, 2023, pp. 1-6, issued in Chinese Application No. 202310709793.3, The Patent Office of the People's Republic of China, Beijing, China.

Communication pursuant to Article 94(3) EPC issued in European Patent Application No. 20947918.7 dated Mar. 27, 2025, 7 pages.

\* cited by examiner

METHOD, DEVICE, AND SYSTEM FOR PAGING AND TRANSMITTING UE IDENTITIES IN WIRELESS NETWORKS

CROSS-REFERENCE TO RELATED APPLICATION

This application is a continuation application of PCT International Patent Application No. PCT/CN2020/107921, filed with the China National Intellectual Property Administration, PRC on Aug. 7, 2020, which is herein incorporated by reference in its entirety.

TECHNICAL FIELD

This disclosure is directed generally to wireless communications, and particularly to methods, systems and devices for paging mobile devices and sending identity information of the mobile devices.

BACKGROUND

Success rate in paging mobile devices is an important performance index in a wireless communication system. Increasing the paging success rate while reducing power consumption has always been an important goal in designing various network devices in a wireless communication network. This is especially true for NarrowBand-Internet of Things (NB-IoT) and Machine Type Communication (MTC) devices. Robust and efficient signaling between the wireless communication network and the mobile devices in a paging process can contribute significantly to power savings.

SUMMARY

This disclosure is directed to methods, systems and devices for paging mobile devices in wireless communication networks.

In some implementations, a method performed by a network element and/or user equipment (UE) in a wireless network is disclosed. The method may include sending, by a first network element of a wireless communication network, a first paging message targeting a UE and comprising a first set of paging parameters to a second network element of the wireless communication network; identifying, by the first network element, a paging failure condition associated with the first paging message; and sending, by the first network element, upon the identification of the paging failure condition, a second paging message targeting the UE and comprising a second set of paging parameters different from the first set of paging parameters to the second network element.

A network element and/or UE is further disclosed. The network element and/or UE includes a processor and a memory, wherein the processor is configured to read computer code from the memory to implement the method above. A computer-readable medium is further disclosed. The computer-readable medium includes instructions or a computer program which, when executed by a wireless terminal, cause the wireless terminal to carry out the method above.

The above embodiments and other aspects and alternatives of their implementations are described in greater detail in the drawings, the descriptions, and the claims below.

DETAILED DESCRIPTION

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

Introduction

Figure 1:
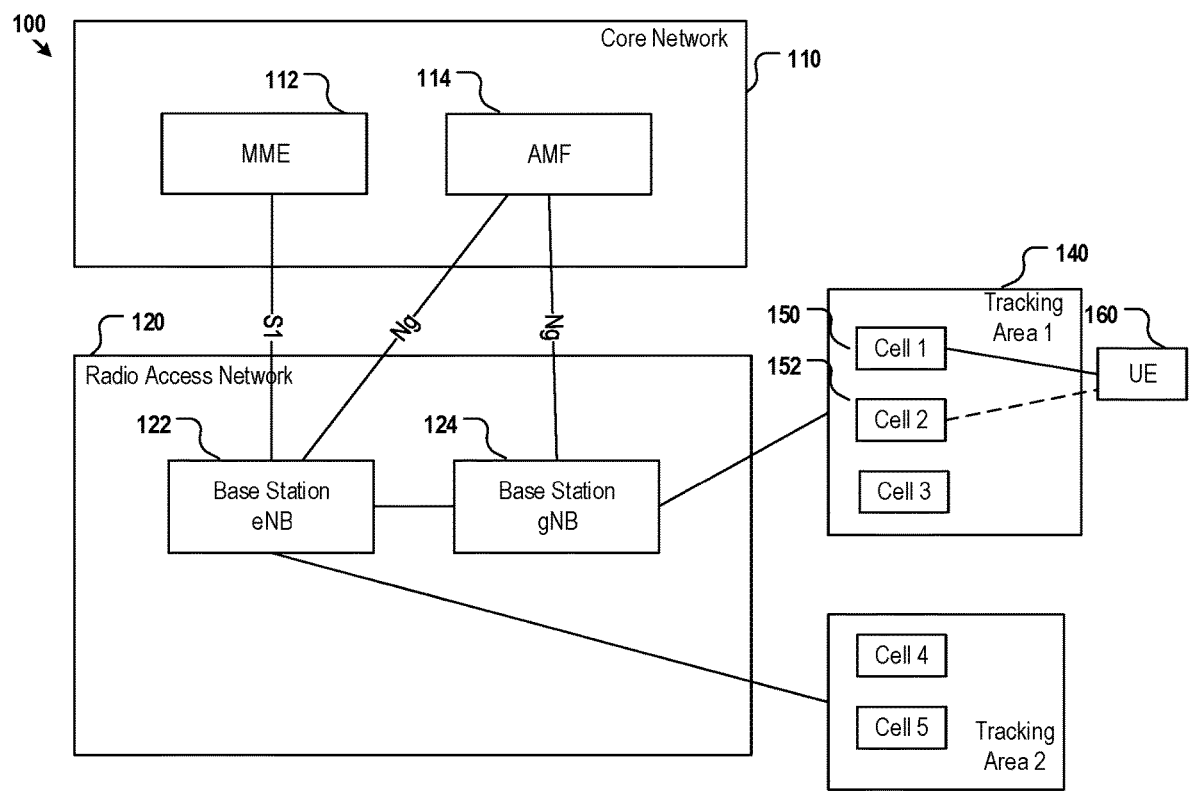
FIG. 1 shows an exemplary wireless communication network.

FIG. 1 shows an exemplary wireless communication network 100 that includes a core network 110 and a radio access network (RAN) 120. The core network 110 further includes at least one Mobility Management Entity (MME) 112 and/or at least one Access and Mobility Management Function (AMF). Other functions that may be included in the core network 110 are not shown in FIG. 1. The RAN 120 further includes multiple base stations, for example, base stations 122 and 124. The base stations may include at least one evolved NodeB (eNB) for 4G LTE, or a Next generation NodeB (gNB) for 5G New Radio (NR), or any other type of signal transmitting/receiving device such as a UMTS NodeB. The eNB 122 communicates with the MME 112 via an S1 interface. Both the eNB 122 and gNB 124 may connect to the AMF 114 via an Ng interface. Each base station manages and supports at least one cell. For example, the base station gNB 124 may be configured to manage and support cell 1, cell 2, and cell 3.

The gNB 124 may include a central unit (CU) and at least one distributed unit (DU). The CU and the DU may be co-located in a same location, or they may be split in different locations. The CU and the DU may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 100 may include one or more tracking areas. A tracking area may include a set of cells managed by at least one base station. For example, tracking area 1 labeled as 140 includes cell 1, cell 2, and cell 3, and may further include more cells that may be managed by other base stations and not shown in FIG. 1. The wireless communication network 100 may also include at least one UE 160. The UE may select a cell among multiple cells supported by a base station to communication with the base station through Over the Air (OTA) radio communication interfaces and resources, and when the UE 160 travels in the wireless communication network 100, it may reselect a cell for communications. For example, the UE 160 may initially select cell 1 to communicate with base station 124, and it may then reselect cell 2 at certain later time point. The cell selection or reselection by the UE 160 may be based on wireless signal strength/quality in the various cells and other factors.

The wireless communication network 100 may be implemented as, for example, a 2G, 3G, 4G/LTE, or 5G cellular communication network. Correspondingly, the base stations 122 and 124 may be implemented as a 2G base station, a 3G NodeB, an LTE eNB, or a 5G NR gNB. The UE 160 may be implemented as mobile or fixed communication devices which are capable of accessing the wireless communication network 100. The UE 160 may include but is not limited to mobile phones, laptop computers, tablets, personal digital assistants, wearable devices, IoT devices, MTC/eMTC devices, distributed remote sensor devices, roadside assistant equipment, and desktop computers.

In the wireless communication network 100, A UE may be located by the core network 110 using a paging mechanism. Paging failures may be caused by various reasons. The various failure modes include, for example, paging failures as a result of Wake Up Signal (WUS) detection inconsistency; paging failures caused by inconsistency on UE state as tracked by the UE and various network elements. The various embodiments disclosed below are directed methods, devices, and systems for handling and resolving such inconsistencies.

While the description below focuses on cellular wireless communication systems as shown in FIG. 1, the underlying principles are applicable to other types of wireless communication systems for paging wireless devices. These other wireless systems may include but are not limited to Wi-Fi, Bluetooth, ZigBee, and WiMax networks.

WUS Detection Related Paging Failure

Wake Up Signal is introduced as an enhancement to the existing paging technology to further reduce power consumption and achieve long battery life on the mobile devices by reducing hardware resource usage when monitoring for paging information. The wake up mechanism in paging monitoring is especially beneficial for low-power devices such as NB-IoT (Internet-of-Things) and eMTC (enhanced Machine Type Communication) devices Referring to FIG. 1, when there is no active communication session between the UE 160 and a base station, then the UE 160 stays in an idle state. The UE 160 continues to monitor paging signals while limiting its usage of the radio resources during the idle state to reduce power consumption. For example, the UE 160 may monitor the paging signal by using techniques including but not limited to Discontinuous Reception (DRX) or Extended Discontinuous Reception (eDRX).

In DRX, resource monitoring and communication activities are managed in cycles, referred to as DRX cycles. Particularly, in wireless communication systems such as LTE and 5G, radio signals are transmitted in radio frames. At a system level, the radio frames are identified in sequence and each radio frame is numbered with a System Frame Number (SFN) that recycles from, for example, 0 to 1023. In the DRX mode, a UE may enter into a sleeping mode to reduce battery consumption. The UE periodically monitors a Paging Occasion (PO). A PO includes a set of Physical Downlink Control Channel (PDCCH) monitoring occasions and can include multiple time slots (e.g. subframe or OFDM symbol) where paging DCI can be sent. The purpose of the periodical monitoring on the PO is to check if there is a paging message for the UE as well as to obtain system information update so that the UE may be able to sync up with the network. If there is no paging message for the particular UE, the UE may return to sleep and wake up to monitor the PO in the next cycle. This cycle is referred to as a paging cycle, or a DRX cycle. The length of the paging cycle is given by the number of radio frames in each cycle.

In eDRX, the UE is able to set and adjust how long it stays in the low power sleep mode before it wakes up to monitor any wireless signal. The eDRX mechanism enables an UE, especially an NB-IoT or an eMTC device to further reduce battery consumption. In addition to DRX and eDRX, a Wake Up Signal (WUS) may further reduce power consumption of the UE, as described below.

Paging with WUS

Figure 2:
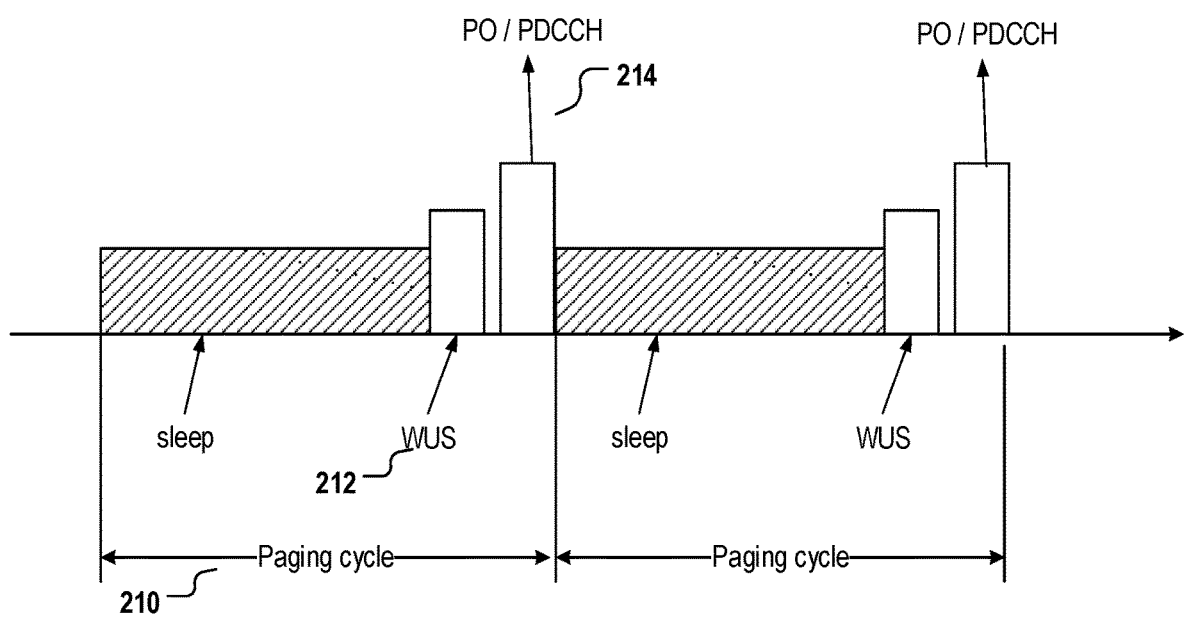
FIG. 2 shows an exemplary paging cycle.

FIG. 2 shows a paging cycle with WUS signal. During a paging cycle 210, a UE progresses through 3 states (or modes): a sleep state while the UE is in the sleep mode and consumes the least power; a WUS detection state 212; and a PO monitoring state 214 while the UE consumes the most power. In the PO monitoring state 214, the UE decodes PDCCH and may further need to decode Physical Downlink Shared Channel (PDSCH) data, by activating and using a full receiver hardware. A Wake Up Signal (WUS) detection state 212 is added before the PO monitoring state to help the UE to determine whether it needs to further decode the PO PDCCH data. Unlike the full receiver hardware used for decoding the PO PDCCH, the WUS detection is done on the physical layer using a lower power consumption hardware circuitry, which may be separated from the full receiver hardware. The UE only needs to activate the full receiver when the WUS detection result indicates existence of PO PDCCH data for the UE to decode. Otherwise the UE will return to sleep immediately and wake up during a next paging cycle. Due to the simplicity and efficiency of the WUS detection hardware, the UE may further reduce power consumption.

In a general paging mechanism, a group of UEs form a paging group and share a same PO and a same serving WUS preceding the PO in a wireless signaling message. As such, even when only one UE in the paging group is targeted by a paging message, a WUS will be present and will be detected and acted upon by every UE in the same paging group. As a result, in a Tracking Area (TA) with high traffic volume, the probability a paging message exists in a PO for the UEs as a group becomes high. In an extreme situation, there may be paging message for at least one UE within the UE group in every PO, and thus there is a WUS preceding each PO. In such a situation, each UE in the UE group would detect the WUS in addition to monitoring and decoding the PO PDCCH every paging cycle, thereby leading to higher power consumption associated with frequent WUS detection than just directly monitoring the PDCCH without the WUS mechanism. Further in such a situation, as the Tracking Area includes multiple cells, one paging message broadcast in the whole Tracking Area may be propagated to all the cells under the Tracking Area. As such, the aforementioned issue may impact UEs in the whole Tracking Area.

To avoid high power consumption in such a situation, the transmission and detection of WUS may be limited. For example, when paging a UE, the core network and the base station may transmit the WUS preceding the PDCCH for paging only in a last cell of the UE. The last cell is the cell that UE visited or connected to most recently. The core network and the base station are further configured to only transmit the PDCCH for paging without the WUS in other cells in the same tracking area, thereby reducing the number of UEs in the UE group that need to monitor the WUS and the PDCCH for paging. Meanwhile, the UE may be configured to monitor the WUS and PDCCH only in the last cell. When the UE is not in the last cell (e.g., when the UE performs a cell reselection, but has not connected to the cell yet), then the UE may be configured to skip WUS detection and proceed to monitoring the PDCCH for paging directly. Referring to FIG. 1 for an example, the UE 160 may be connected to cell 1 at one time point and cell 1 is the last cell for UE 160. Subsequently, the UE 160 moves to cell 2 and makes a cell reselection to select cell 2. However, the UE 160 has not yet interacted with the core network under cell 2 yet. So even the UE 160 is in cell 2 now, the last cell for the UE 160 is still cell 1. When monitoring the PDCCH for paging in cell 2, since cell 2 is not the last cell for the UE 160, UE 160 skips the WUS detection and proceeds to monitoring the PDCCH directly. Then subsequently, the UE 160 makes an interaction with the core network in cell 2. Cell 2 now becomes the last cell for the UE 160 and UE 160 will start to detect the WUS before proceeding with the PO PDCCH decoding. By using this scheme, the frequency of transmitting and monitoring the WUS is greatly reduced thus saving more energy.

As described above, the last cell plays a critical role for the scheme to function flawlessly as it is used for determining if WUS detection is required before decoding the PDCCH for paging. It is critical that the last cell of a UE is consistently recorded across the UE and the core network. An inconsistency in the last cell record may cause a paging failure. Under certain abnormal network conditions, such as a signaling link failure or network overload, the last cell record may become inconsistent. For example, assuming the last cell for the UE is cell 1. At one time point the UE may move to cell 2 and attempt to initiate an interaction with the core network. However, the interaction may fail on the core network side. In this case, the UE may update its own last cell record to cell 2, whereas the core network, such as the MME or the AMF, keeps a stale last cell record (cell 1) for the UE. In this situation, when the MME or the AMF needs to send a paging message to the UE, since the MME or the AMF does not consider cell 2 as the last cell of the UE, the paging message eventually transmitted in cell 2 only includes the PDCCH for paging and does not include the WUS. However, on the UE side, the UE considers cell 2 as the last cell, so the UE tries to detect the WUS signal before proceeding to decode the PDCCH for paging, yet the WUS signal is not carried in the paging message, so the paging eventually fails.

UE State Inconsistency

A UE may be in various states during operation. These states include but are not limited to an idle state, an inactive state, and a connected state. In one scenario, the UE state may become inconsistent as tracked across the UE, the base station, and the core network. For example, when the base station initiates a UE related procedure involving the core network and the UE, the core network and the UE may mark the UE at inconsistent states depending on the outcome of the actions they are involved in. For example, the operation on the UE side may be successful, whereas the operation fails on the core network side. In this case, it may be possible that the UE marks itself in one state while the core network marks the UE in another state, leading to inconsistency in UE state. As a specific example in a UE context release procedure involving both the UE and the core network, an error condition in this procedure occurring in the core network may cause the core network to consider the UE as being in connected state while the UE, being unaware of the error condition, may consider itself in idle state. Such UE state inconsistency may contribute to subsequent paging failure, as the core network may consider the UE is not in a right state to receive the paging message. More details will be given in embodiments later in this disclosure.

BRIEF DESCRIPTION OF EMBODIMENTS

In this disclosure, various embodiments are described for solving the WUS related paging issue caused by inconsistent last cell record. Various other embodiments are further described for solving the UE state inconsistency issues. Furthermore, additional embodiments to enhance the paging messaging are descripted. Other embodiments related to transmission of UE identity information in various cell coverage mode.

Embodiment 1

Figure 3:
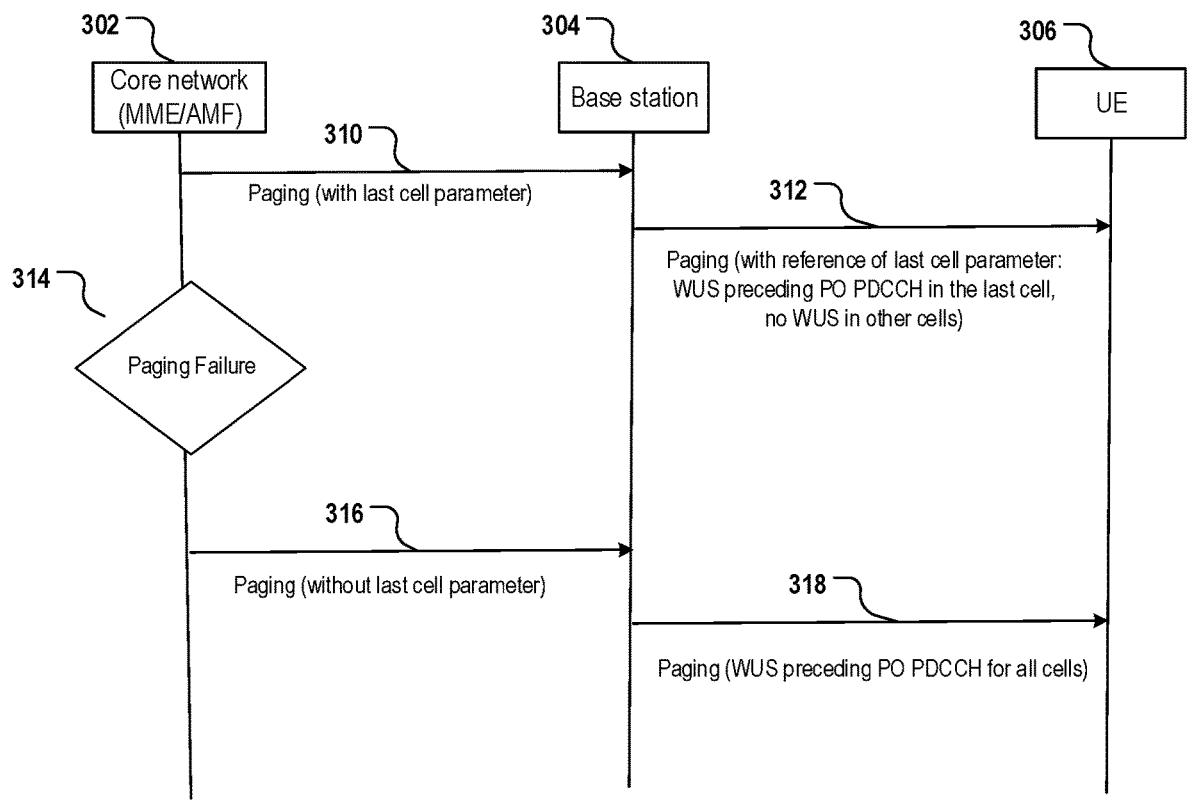
FIG. 3 shows a detailed exemplary paging message flow.

Refer to FIG. 3 for an exemplary paging procedure. In this paging procedure, the core network 302 (MME/AMF) may need to page the UE 306. A paging message 310 targeting the UE 306 may be initiated from the core network 302 and sent to the base station 304 via an interface such as an S1 or Ng interface. The core network includes at least one MME and/or at least one AMF. The base station may be any kind of signal transmitting and receiving station including gNB, eNB, or NodeB. The paging message 310 may carry a set of paging parameters include a recommended cell list, and the recommended cell list further contains the last cell information of the UE being paged. The last cell information may include a cell identifier such as the cell ID. As described earlier, the last cell is the cell that the UE visited or connected to most recently. When the base station receives the paging message including the last cell information, the base station transmits the paging message to all the cells managed by the base station and belonging to the same tracking area as the UE. The base station treats the last cell differently by transmitting the WUS preceding the PO PDCCH in the paging message 312. For cells other than the last cell, the base station pages the UE by transmitting the PO PDCCH only, without transmitting the preceding WUS (not shown in FIG. 5).

The behavior of the UE is described for multiple scenarios below. In a first scenario, assuming the UE is in the last cell. UE monitors the WUS first, and since there is a WUS transmitted by the base station as described earlier, the WUS is detected indicating there may be a paging message for the UE in the corresponding PO. The UE then further monitors and performs PDCCH for paging decoding, and receives the paging message successfully. It is to be understood that based on the PO PDCCH decoding result, Physical Downlink Shared Channel (PDSCH) decoding may need to be further performed. In a second scenario, the UE may reselect a new cell other than the last cell, and has not yet connected to the new cell. The UE monitors the paging message in the new cell. In this case, since the new cell is different from the last cell, the UE will skip the WUS detection and may monitor the PO PDCCH directly, in accordance with the format of the paging message transmitted by the base station. The UE may also be able to correctly receive the paging message. In either scenario above, once the UE receives the paging message, UE responds to the paging message via signaling such as Non-Access Stratum signaling.

In a successful paging procedure as explained above, when the core network initiates a paging message with the last cell parameter, the UE has a consistent last cell record with the core network and the UE is able to make a right decision on whether to detect the WUS before decoding the PO PDCCH when receiving the paging message.

In another scenario, however, the last cell as recorded by the core network and the UE may become inconsistent. For example, at one time instant, the UE visits and connect to a cell, such as cell, and the UE later reselects another cell, such as cell 2, and then initiates a request for connection. The connection request may include but is not limited to any one of:

RRC (Radio Resource Control) connection request;
RRC connection resume request;
RRC early data request; or
RRC connection reestablishment request.

After the base station receives the request, it tries to set up an S1 or Ng connection between the MME/AMF and the UE. However, the connection setup may fail. For example, the MME or the AMF in the core network may reject the request due to an overload condition. As a result, MME or AMF may still consider the previous cell that UE visited as the last cell, e.g., cell 1. On the contrary, the UE may consider the last cell as the cell where the UE initiates RRC connection, e.g., cell 2. This causes an inconsistency on the last cell as recorded by the core network and the UE. Still referring to FIG. 3, if there is a paging message targeting the UE, the core network sends the paging message 310 including the last cell (cell 1, according to the last cell as recorded by the core network) information to the base station via the S1 or Ng interface. The base station then pages the UE by transmitting the paging message 312 in cell 2 without the including a WUS before the PO PDCCH, since cell 2 is not the last cell per the paging message initiated from the core network. Because the UE is currently in cell 2 and considers cell 2 as its last cell, the UE tries to detect a WUS before proceeding with the PO PDCCH decoding. Since the paging signal does not contain any WUS in cell 2, the UE determines that there is no PO PDCCH for it to further monitor and thus fails to receive the paging message.

In this embodiment, a solution is provided in order to ensure that the UE receive the paging message. Referring to FIG. 3, after the UE fails to receive the paging message 312 in cell 2 as described above, the core network determines that the paging fails at 314 by, for example, detecting a timeout condition since the UE does not respond. The core network then resends a paging message 316 to the base station. In this second attempt, the core network may remove the last cell information from the paging message.

In some implementations, the recommended cell list may be carried in the Assistance Data for Recommended Cells information element in the paging message. The last cell may be listed as the first entry in the Assistance Data for Recommended Cells. If the core network determines to remove the last cell information from the paging message, the paging message may not carry Assistance Data for Recommended Cells. On the base station side, if the base station does not acquire the Assistance Data for Recommended Cells in the paging message, the node consider there is no last cell. In this case, the base station sends a paging message with the WUS preceding the PO PDCCH to all its cells in the tracking area to which the UE belongs, regardless of whether a cell is the last cell or not. As shown in FIG. 3, the paging message 318 is sent to all cells including cell 2. The paging message 318 further include a WUS that the UE is expecting to detect within cell 2. As such, even though the core network and the UE has a different recorded last cell information for the UE, after the second attempt on paging the UE, the UE receives the paging message.

As described above, the core network modifies the paging signal (or generally, one or more paging parameters contained in the paging signal) in a second paging attempt after an initial paging effort fails. Such modification enables the UE to correctly detect and decode the paging message.

Embodiment 2

In embodiment 2, a solution is provided to maintain the last cell record consistency between the core network and the UE.

Figure 4:
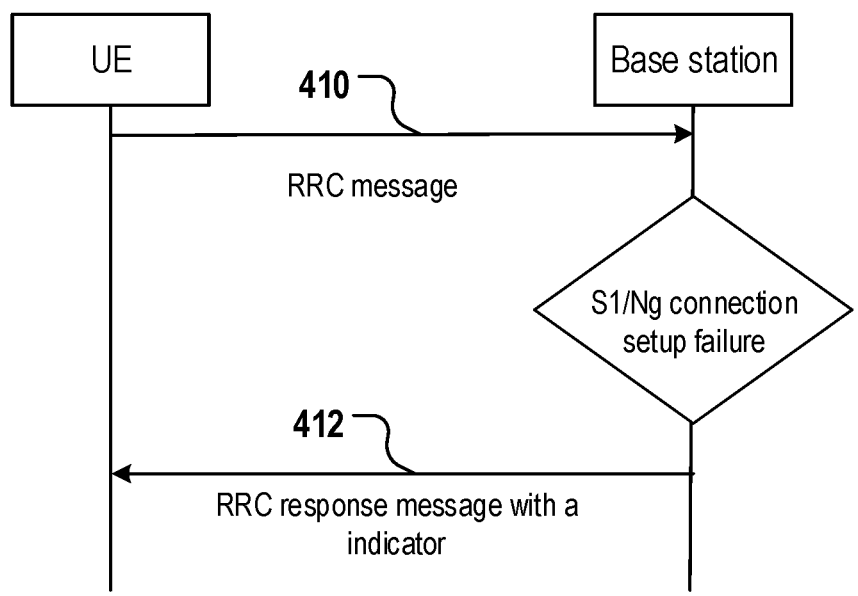
FIG. 4 shows an exemplary message flow for handling last cell information.

For example, at one time instant, the UE may be in cell 1 and considers cell 1 as its last cell. The UE then reselect cell 2 and tries to set up a connection with the base station. Referring to FIG. 4, the UE may send an RRC message 410 to the base station. The RRC message may include but is not limited to any one of:

RRC connection request;
RRC connection resume request;
RRC early data request; or
RRC connection reestablishment request.

After the base station receives the RRC message, the base station may attempt to set up an S1 or Ng connection between the UE and the core network, this connection may be a logical link. If the S1 or Ng connection setup fails, the base station may send a response message 412 to reject the RRC connection. The response message may include but is not limited to any one of:

RRC connection reject message;
RRC connection release message; or
RRC connection reestablishment reject message.

Even though UE fails to set up the S1 or Ng connection in cell 2 in this case, the UE may still consider cell 2 as the last cell after the connection setup request and updates its last cell record. The UE further determines that it is required to monitor the WUS in this cell as it is its last cell of record. However, the core network considers the previous cell that UE visited or connected to as the last cell, e.g., cell 1, and sends a paging message targeting the UE carrying the last cell information (cell 1) to the base station. The base station pages the UE by transmitting the WUS preceding the PO PDCCH only in cell 1, and without the WUS in cells other than cell 1. As such, the UE misses the paging message since the UE is expecting a WUS to trigger the PO PDCCH decoding but does not detect any WUS. The paging of the UE thus fails.

In order to ensure that the UE receive the paging message, this embodiment provides a solution to enforce the last cell record consistency between the UE and the core network. Specifically, when the base station determine that the S1 or Ng connection setup fails, the base station sends an RRC response message 412 carrying an indicator. In some implementations, the indicator may include a single bit indicating the last cell information or how the UE should monitor the paging signal. For example, if the bit is set to 1 (true), it may indicate at least one of:

The last cell stored in the core network is unchanged by the RRC message initiated by the UE.
S1 or Ng connection setup fails.
The UE should retain its last cell record (in this example, cell 1 should be retained as the last cell to match the last cell record in the core network.

The UE should monitor the PO PDCCH directly for paging in the current cell (cell 2 in this example) and skip the WUS detection.

When the UE receives the RRC response message 412, it may check the indicator carried in the RRC response message to determine whether the last cell record in the core network has been updated. Based on this information, the UE may retain its last cell record (cell 1) to match the core network record without updating its last cell record to cell 2. Alternatively, the UE may still update its last cell record to cell 1 and additionally create an internal flag for this inconsistency condition. When the internal flag is set, the UE would monitor the PO PDCCH directly and skips the WUS detection.

Embodiment 3

Embodiment 3 provides a solution to solve the cell state inconsistency issue as described earlier. This solution may be initiated from the base station side.

In the wireless communication network, a UE context suspend procedure is used to suspend the UE context, the UE-associated logical S1 or Ng connection and the related bearer contexts in the RAN and the core network. The base station may trigger the UE context suspend procedure due to an overload condition or as instructed by the User Plane (UP) solution. In order to reduce power consumption, the base station may suspend a UE via RRC release message with suspend indication before receiving a suspend confirmation in the form of, e.g., a UE context suspend response message, from the core network. The UE, upon receiving the RRC release with suspend indication, suspends the UE context and transits to an idle mode even though the suspend operation has not been confirmed (or approved) by the core network.

If the core network rejects the UE context suspend, the MME or the AMF would respond to the base station with a UE context suspend failure or ERROR indication message, and the core network would still consider the UE as in connected mode, whereas the UE has entered idle mode already. As such, an inconsistency on the UE state between the core network and the UE is created.

Figure 5:
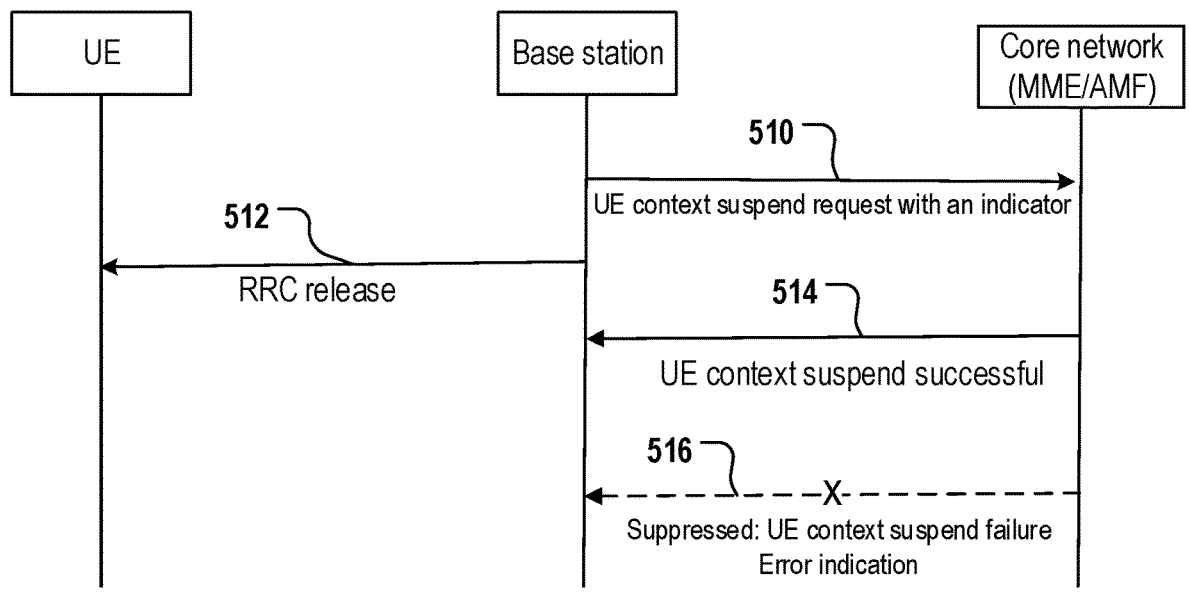
FIG. 5 shows an exemplary message flow for ensuring UE state consistency.

This embodiment provides a solution for resolving this UE state inconsistency. The solution is to ensure that the core network may suspend the UE context successfully by providing an option for a forced suspend. In some implementations, a UP solution may be used. Referring to FIG. 5, the base station may send a UE context suspend request message 510 carrying an indicator and the indicator, for example, may include a single bit in the message. When the indicator bit is set to 1 (true), it may indicate at least one of:

The base station suspends the UE without a confirmation or an approval from the core network.
The base station suspends the UE before the reception of a successful response from the core network.
The base station suspends the UE right after the base station sends the suspend request to the core network.
The core network is forced to suspend the UE unconditionally regardless if there is an error condition when performing the UE context suspend.

For example, right after the base station sends the UE context suspend request message 510 to the core network, the base station proceeds to send an RRC release message 512 to the UE without waiting for a response from the core network. On the core network side, even if there is an error condition while performing the UE context suspend, the core network suppresses an error or failure response message 516 from being sent back to the base station. The core network further update the UE state to indicate that the UE context operation is successful. Alternatively, the core network may choose to send a UE context suspend successful message 514 back to the base station.

In this embodiment, by introducing a forced UE context suspend operation, the inconsistent UE state issue caused by the UE context suspend operation may be resolved. The principles discussed herein applies to other UE context operations that may lead to UE state inconsistency as perceived by the UE and by the core network.

Embodiment 4

Embodiment 4 provides another solution to solve the cell state inconsistency issue as described earlier. This solution may be initiated from the base station side.

In the wireless communication network, a UE context release procedure is used to enable the base station to request the core network to release the UE associated logical S1 or Ng connection. The base station may trigger the UE context release procedure due to an overload condition or as instructed by a Control Plane (CP) solution. In order to reduce power consumption, the base station may release the UE via an RRC release message before receiving a confirmation or an approval from the core network. On the UE side, if the UE receives the RRC release message, the UE releases the UE context and transits to an idle mode.

If the core network rejects the UE context release, the core network would still consider the UE as in connected mode. As such, an inconsistency on the UE state between the core network and the UE is created.

Figure 6:
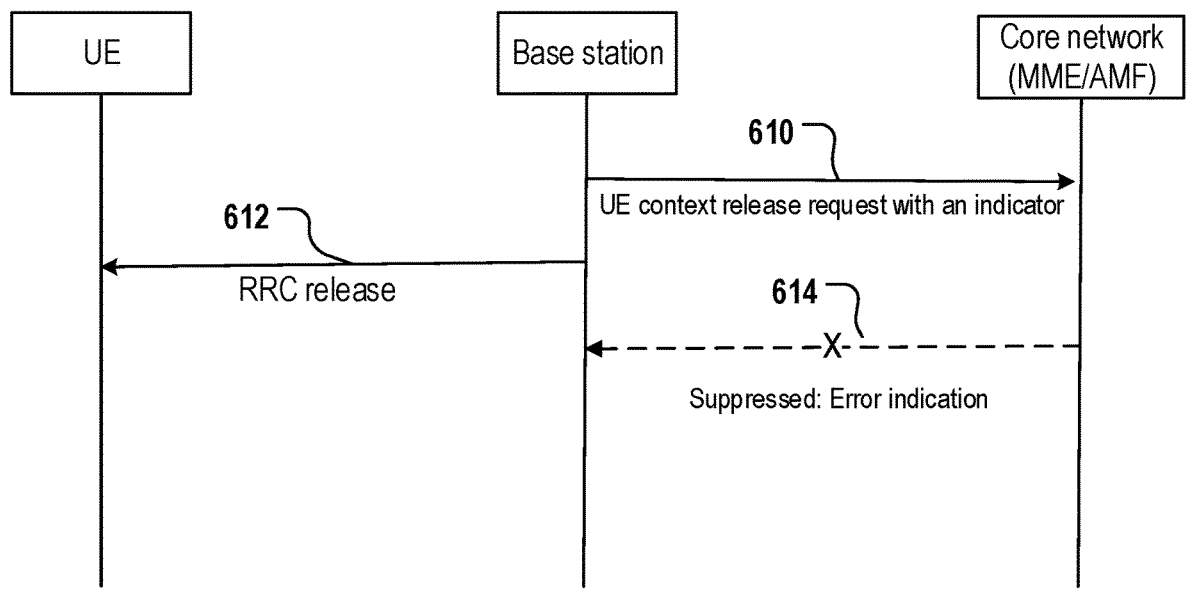
FIG. 6 shows another exemplary message flow for ensuring UE state consistency.

This embodiment provides a solution for resolving this UE state inconsistency. The solution is to ensure that the core network may release the UE context successfully by providing an option for a forced release. In some implementations, a CP solution may be used. For example, in idle mode, UE's context is released. Referring to FIG. 6, the base station may send a UE context release request message 610 carrying an indicator and the indicator, for example, may include a single bit in the message. When the indicator bit is set to 1 (true), it may indicate at least one of:

The base station releases the UE context without a confirmation or an approval from the core network.
The base station releases the UE context before the reception of a successful response from the core network.
The base station releases the UE context right after the base station sends the UE context release request to the core network.
The core network is forced to release the UE context unconditionally regardless if there is error condition when performing the UE context release.

For example, right after the base station sends the UE context release request message 610 to the core network, the base station proceeds to send an RRC release message 612 to the UE without waiting for an approval or confirmation from the core network. On the core network side, even if there is an error condition while performing the UE context release, the core network suppresses an error indication message 614 from being sent back to the base station. The core network further update the UE state to indicate that the UE context operation is successful.

In this embodiment, by introducing a forced UE context release operation, the inconsistent UE state issue caused by the UE context release operation may be resolved. The principles discussed herein applies to other UE context operations that may lead to UE state inconsistency as perceived by the UE and by the core network.

Embodiment 5

Embodiment 5 provides another solution to solve the cell state inconsistency issue. This solution is initiated from the core network side.

In some practices, during the UE context release procedure and UE context suspend procedure, in order to reduce power consumption, the base station may release or suspend the UE context before confirming a successful release or suspend operation with the core network. However, the core network may not be able to release or suspend the UE successfully under certain fault conditions. In this case, the base station and the core network need to be coordinated or synchronized on the UE context operation.

Figure 7:
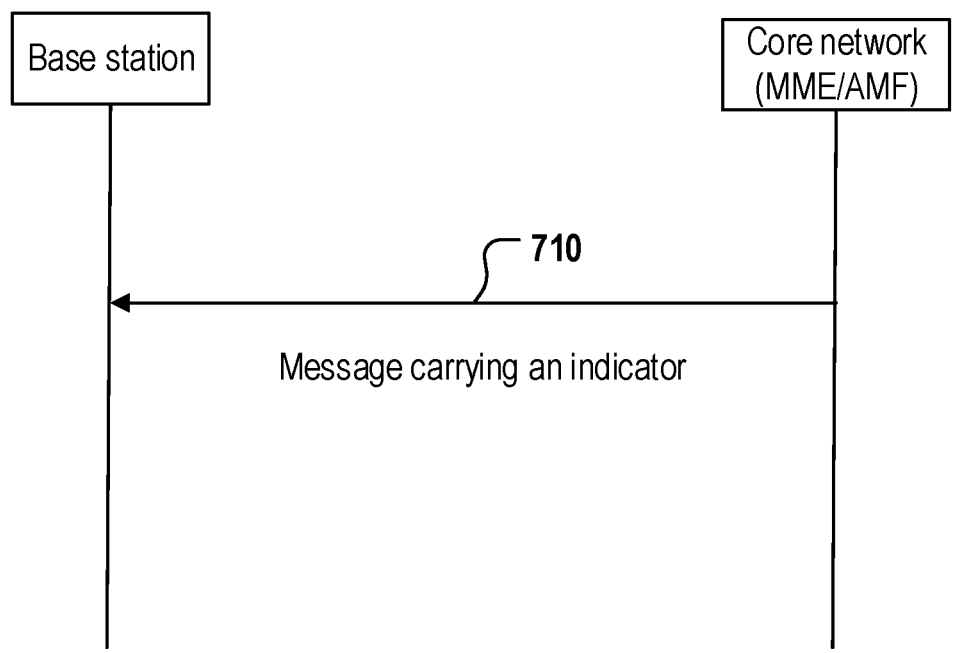
FIG. 7 shows a handshake mechanism for synchronizing UE context operation between the core network and the base station.

In this embodiment, a handshake between the core network and the base station is performed before the subsequent UE context release or suspend procedure so that an agreement is reached between the core network and the base station on how to handle these procedures. This handshake may be initiate from the core network side. With the handshake, agreement may be reached on whether the base station is allowed to proceed with a UE context release or suspend procedure without receiving a confirmation or approval from the core network first. Referring to FIG. 7, a message 710 carrying an indicator for this synchronization handshake purpose may be sent from the core network to the base station. In some implementations, the message may be an S1 or Ng message. In particular, this S1 or Ng message may include at least one of:
  initial context setup request;
  connection establishment indication;
  AMF CP relocation indication;
  handover request;
  handover command;
  path switch request acknowledge;
  handover success; or
  UE context resume response message.

The indicator may include a single bit in the above message indicating whether the base station is allowed to release or suspend UE without confirming the successful operation with the MME or the AMF, or before the reception of a successful response, or right after the base station sends the request to the MME or the AMF. For example, if the indicator is set to 1 (true), it represents that the base station is allowed to release or suspend the UE context before confirming the successful response from the MME or the AMF. In this case, the core network and the base station may have an agreement that the UE context operation is forced to be successful, and the core network needs to update the cell state to indicate the UE context operation is successful. On the other hand, if the indicator is set to 0 (false), it represents that the base station is not allowed to release or suspend the UE context before confirming the successful response from the MME or the AMF. That is, the base station has to wait till receiving the confirmation or approval from the core network before it proceeds to send the UE context release message to the UE. If the UE context operation on the core network side fails, the base station receives an error indication or a failure message, and the base station will not proceed to release the UE context based on the agreement.

Furthermore, based on practical requirement, the agreement may be updated any time if needed.

Embodiment 6

This embodiments provides several solutions to transmit paging configuration information from a CU to a DU.

As described earlier, In RRC idle or inactive mode, a UE such as a New Radio (NR) UE, an LTE UE, or eMTCNB-IoT device, may use DRX in order to reduce power consumption. The paging message is transmitted in Paging Occasion (PO). UE monitors in a PO in every paging cycle.

Both the base station and the core network may send DRX configuration information to the UE. For certain UEs which are delay insensitive, such as eMTC, NB-IoT, or NR UE, the core network and UE may coordinate a UE special DRX cycle via Non Access Stratum (NAS) message. When the core network pages a UE and sends a paging message to the base station, the paging message may carry the UE special DRX cycle configuration including the value of DRX cycle. For some UEs that requires low power consumption, such as eMTC, NB-IoT, or NR UE, the core network and UE could coordinate an eDRX cycle and Paging Time Window (PTW) via NAS message. The PTW is a period configured for a UE, during which the UE monitors Paging Occasions following DRX cycle. When the core network pages a UE and sends the paging message to the base station, the paging message may carry the eDRX configuration including the eDRX cycle and PTW. The base station may broadcast the default paging DRX cycle including the value of DRX cycle, as well as the minimum UE specific DRX cycle in System Information Block (SIB). A CN (core network) UE Paging DRX cycle may be determined as the minimum value of the default DRX cycle and the UE specific DRX cycle, if the UE specific DRX cycle is allocated by the core network. Alternatively, a CN UE Paging DRX cycle may be considered as the minimum value of the default DRX cycle and a paging cycle, where the paging cycle is the maximum of the UE specific DRX value and the minimum UE specific DRX value. If the UE specific DRX is not configured by upper layers or if the minimum UE specific DRX value is not broadcast in system information, then the default DRX value may be applied and the CN UE Paging DRX cycle is set to the default DRX value.

Specifically, the UE should monitor the RAN paging message triggered from the base station using DRX in inactive mode. The RAN paging cycle configuration including the value of the DRX cycle is configured via an RRC message that triggers the UE to move into the inactive mode.

If the UE is configured with eDRX, the base station may know the exact DRX cycle of the UE. In order to avoid UE missing the paging message, the DRX cycle may be determined by the shortest of the DRX cycle that the core network configures and the DRX cycle that the base station instructs in SIB or an RRC message. Hence, if the UE is configured with eDRX, the DRX cycle may be determined by the shortest of the RAN paging cycle, the UE specific paging cycle (if allocated by the core network) and the default paging cycle during the PTW, and the DRX cycle may be determined by the RAN paging cycle outside the PTW.

Alternatively, if the UE is configured with eDRX, the DRX cycle may be determined as the shortest of the minimum value of the default DRX cycle and a paging cycle that is maximum of the UE specific DRX value and the minimum UE specific DRX value, if the UE specific DRX is configured by the core network or if the minimum UE specific DRX value is broadcast during the PTW, and the DRX cycle may be determined as the RAN paging cycle outside the PTW.

Alternatively, if the UE is configured with eDRX, the DRX cycle may be determined by the default DRX value if the UE specific DRX is not configured by the core network or if the minimum UE specific DRX value is not broadcast during the PTW, and the DRX cycle may be determined by the RAN paging cycle outside the PTW.

In CU-DU split architecture, CU is a center unit that connects to at least one DU, DU is a distributed unit. The interface between CU and DU includes F1 interface or W1 interface.

In a paging scenario, the CU receives a paging message first and sends it to the DU using an F1 message or a W1 message, such as paging message. The DU is responsible for the scheduling and transmission of the paging signal to the UE. The DU should be able to know the transmission occasion of the paging signal. As such, the DU should get information about the DRX cycle of the UE. Furthermore, if the UE is configured with eDRX, the DRX cycle during and outside the PTW is different. So the DU should be able to distinguish the DRX cycle during and outside the PTW.

In this embodiment, several solutions are provided so the DU may be able to get the information mentioned above.

Solution 1

Solution 1 is for the CU to deliver a paging message via the F1 interface (for 5G) or the W1 interface (for 4G) to the DU. The paging message includes RAN paging value, CN UE paging DRX cycle, and eDRX configuration including the value of the eDRX cycle and Paging Time Window (PTW), if the UE is configured with eDRX.

Solution 2

Solution 2 is for the CU to deliver a paging message via the F1 interface (for 5G) or the W1 interface (for 4G) to the DU. The paging message includes a paging value, RAN paging cycle, and eDRX configuration including the value of eDRX cycle and Paging Time Window (PTW), if the UE is configured with eDRX. The paging cycle is the minimum of the RAN paging cycle and the CN UE paging DRX cycle.

Solution 3

Solution 3 is for the CU to deliver a paging message via the F1 interface (for 5G) or the W1 interface (for 4G) to the DU. The paging message includes UE special DRX cycle if allocated by the core network, default paging DRX cycle, RAN paging cycle and eDRX configuration including the value of eDRX cycle and Paging Time Window (PTW), if the UE is configured with eDRX.

Solution 4

Solution 4 is for the CU to deliver a paging message via the F1 interface (for 5G) or the W1 interface (for 4G) to the DU. The paging message includes the UE special DRX cycle if allocated by the core network, default paging DRX cycle, minimum UE specific DRX value if broadcast, RAN paging cycle and eDRX cycle and Paging Time Window (PTW), if the UE is configured with eDRX.

Embodiment 7

This embodiment provides a paging enhancement in a CU-DU split architecture.

For the CU-DU split architecture, a CU (such as ng-eNB-CU, gNB-CU) receives the paging from the core network, and then delivers it to a DU. The DU (such as ng-eNB-DU, gNB-DU) is responsible of the paging signal scheduling and transmission.

In the paging message from the core network, some paging assistance information may be supplied to help the base station to transmit the paging message. This information is also beneficial for the DU.

Figure 8:
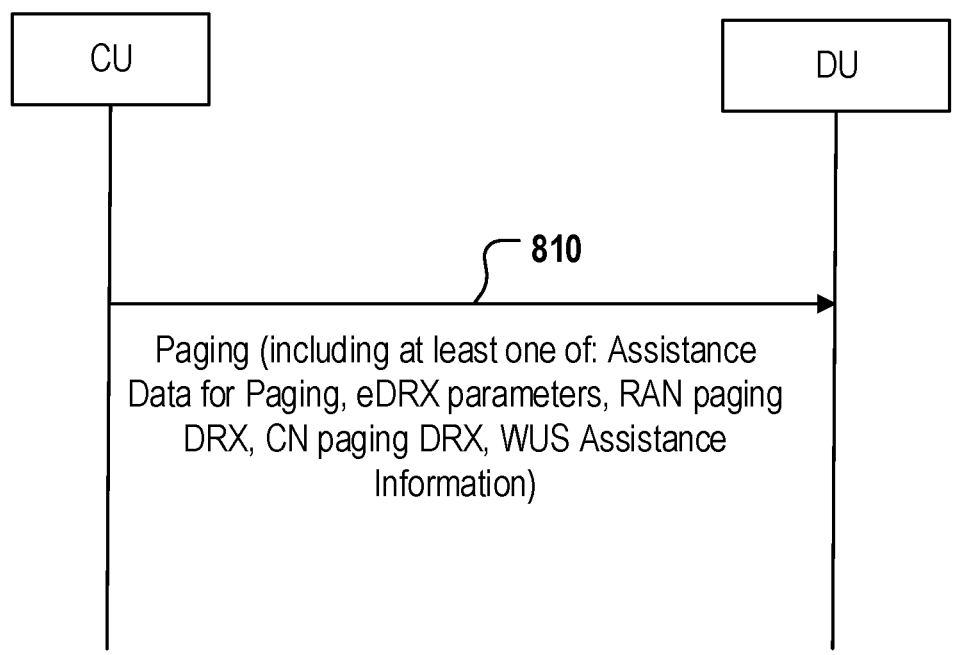
FIG. 8 shows an exemplary message flow for sending Paging Assistance Information.

Referring to FIG. 8, in this embodiment, the CU is configured to deliver the paging assistance information to the DU via the F1 or the W1 interface. The paging assistance information may be carried in a paging message 810 sent from the CU to the DU.

The paging message may include at least one of but is not limited to:
  assistance data for paging;
  eDRX parameters;
  RAN paging DRX;
  CN (core network) paging DRX; or
  WUS assistance information.

In particular, the assistance data for paging may include:
  Assistance data for recommended cells;
  Assistance data for CE (coverage enhancement) capable UEs;
  Paging attempt information.

The WUS assistance information may include paging probability information.

Embodiment 8

This embodiment provides another paging enhancement in a CU-DU split architecture.

As described earlier, in an idle or an inactive mode, the UE needs to monitor the paging message. In order to save the power, the UE can monitor the WUS, and then monitor the PDCCH if the WUS is detected indicating there is paging in the PO. If one UE in the same paging group is paged, all the UEs in this paging group need to monitor the PDCCH. Hence, Group Wake Up Signal (GWUS) is introduced. Under the GWUS scheme, the UE may monitor the GWUS and then WUS if GWUS is detected indicating there is a WUS, and then monitor the PDCCH if the WUS is detected indicating there is paging in the PO.

In the CU-DU architecture, when a paging message is sent from the core network, the WUS Assistance Information including paging probability information to be used by base station for determining the WUS group of the UE is sent to the CU. However, it is the DU that is responsible for the scheduling and transmission of the GWUS. Therefore, a solution is provided in this embodiment so that the DU may get the above GWUS related information from the CU.

In this implementation, the CU is configured to deliver the WUS Assistance Information or paging probability information to the DU through a paging message via the F1 or W1 interface.

Embodiment 9

This embodiment provides another paging enhancement. When a UE is in inactive mode, a paging message may be sent within a RAN-based Notification Area. When a source cell that change the UE into inactive mode needs to page the UE, a paging message may be sent to a target cell. For the target cell, it may need to transmit GWUS in the subsequent paging message targeting the UE. Hence, the parameter for determining the WUS group and transmission occasion information of the UE may be sent to the target cell to enhance the paging performance.

In this embodiment, the source cell is configured to deliver the assistance information such as WUS Assistance Information, paging probability information, or eDRX configuration including the value of eDRX cycle and Paging Time Window (PTW) to the target cell using a RAN paging message sent from the source cell to the target cell via an X2 or Xn interface.

Embodiment 10

This embodiment provides another paging enhancement.

When a UE is in inactive mode, the cell may trigger a paging to the UE. If the cell is configured to transmit GWUS in the paging message, then the parameters for determining the WUS group of the UE is also necessary. However, this parameters are stored in the core network, and is sent to the base station only when a paging is initiated from the core network. Hence, a solution is needed for this parameter to be sent from the core network to the base station in UE specific connection establishment in Ng or S1.

In this embodiment, the core network is configured to deliver the WUS Assistance Information or paging probability information to the base station in UE specific connection establishment in Ng or S1. WUS Assistance Information or paging probability information can be carried in messages including but is not limited to:

Initial context setup request;
UE context modification request;
Handover request; or
Path switch request acknowledge.

In particular, WUS Assistance Information or paging probability information may be carried in the Core Network Assistance Information for RRC INACTIVE information element (IE).

Embodiment 11

This embodiment provides an enhancement for a UE to send identity information.

For a certain UE, such as a LTE, eMTC, NB-IoT, or NR UE, it may have the capability to connect to the core network in a 5G communication system. In order to identify the UE, the UE needs send its UE identity in the 5G system to the core network. For example, the UE sends an RRC message including a 5G S-TMSI of the UE to the base station, and then the base station delivers the 5G S-TMSI to the core network.

However, the 5G S-TMSI takes 48 bits. It may be too long if the UE includes the 5G S-TMSI in an RRC message such as an RRC connection request message. As such, a truncated 5G-S-TMSI may be used. For example, the truncated 5G-S-TMSI may be a 40 bit UE identifier constructed from the 5G-S-TMSI. The truncated 5G-S-TMSI may be composed by n LSBs (Least Significant Bit) of the AMF Set ID, m LSBs of the AMF Pointer, and (40−n−m) LSBs of the 5G-TMSI, where m and n are positive integers, and (m+n) <40. The core network and UE use the same rule to produce the same 5G-S-TMSI.

Additionally, the signal quality of the UE contributes to the service quality. If the UE is in a coverage enhancement mode, for example, if the Reference Signal Received Power (RSRP) of the UE is under a threshold, the UE may transit to a coverage enhancement mode, for example, as instructed by the base station. While in the coverage enhancement mode, the UE has limited radio capability such as limited transmission bit rate. On the other hand, if the UE is in a normal coverage mode, the UE has better channel quality and is provided with better service, for example, fast transmission bit rate.

When a UE triggers a connection, and sends a RRC message or UL data to the base station, if this message is too big and the UE has a limited radio capability, this message may fail. The RRC message may include but is not limited to:

RRC connection request;
RRC connection reestablishment request;
RRC connection resume request;
RRC Early Data Request.

The UL data may be UL MAC PDU (UpLink Medium Access Control Protocol Data Unit) and the like.

In order to solve this problem, in this embodiment, the UE may include the 5G-S-TMSI in the RRC message or UL data if the UE is in normal coverage mode and include the truncated 5G-S-TMSI if the UE is in the coverage enhancement mode.

In particular, it is up to the AS (Access Stratum) to select the 5G-S-TMSI or truncated 5G-S-TMSI, and the NAS may not be aware of the selection. The NAS may send the UE identity including 5G-S-TMSI and truncated 5G-S-TMSI to the AS. For the truncated 5G-S-TMSI, the value of m, n used to produce the truncated 5G-S-TMSI should also be sent to the AS. If the AS chooses the truncated 5G-S-TMSI, the value of m and n may be included in the RRC message or UL data.

To summarize, the disclosure above describes a method and system for reliably delivering and receiving paging message and reducing power consumption. Under a paging failure condition, a second paging message is sent without the last cell information such that even there is an inconsistency between the core network and the UE on the last cell record, the UE is still able to decode the PO PDCCH and receive the paging message. Further, an RRC message between the base station and the UE is extended to carry an indicator for indicating whether the core network has not updating its last cell record for the UE so the UE may retain its last cell record. UE context suspend and UE context release message are also extended to carry an indicator to signal a forced core network UE context operation, so that the core network updates the UE state indicating that the UE context operation is successful even when the UE context operation fails. A handshake mechanism is further introduced between the core network and the base station, so that the two network entities establish an agreement as to whether the base station is allowed to send an RRC release message to the UE before receiving a confirmation or approval from the core network. The schemes described in this disclosure help increase paging successful rate in a wireless communication system.

This disclosure also describes various embodiments for enhancing paging performance. In some embodiments, in a CU-DU split architecture, the CU may send paging related information to the DU to facilitate the DU to improve paging performance. The paging related information including eDRX configuration parameters, paging assistance information and WUS assistance information. Some other embodiments describe sending WUS related information between various network elements, such as the core network, the base station, the source cell, and the target cell.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
    sending, by a first network element of a wireless communication network, a paging message comprising a set of paging parameters to a second network element of the wireless communication network via a communication interface, wherein the set of paging parameters comprise a paging time window (PTW), an extended Discontinuous Reception (eDRX) cycle, and a Radio Access Network (RAN) paging cycle, and wherein the set of paging parameters comprised in the paging message is used by the second network element for transmitting a paging signal, and wherein the first network element comprises a central unit (CU) of a base station, and the second network element comprises a distributed unit (DU) of the base station.

2. The method of claim 1, wherein the communication interface comprises at least one of an F1 interface or a W1 interface.

3. The method of claim 1, wherein the set of paging parameters further comprise a Core network (CN) UE paging Discontinuous Reception (DRX) cycle.

4. The method of claim 1, wherein the base station comprises one of a next generation NodeB (gNB), or an LTE evolved nodeB capable of connecting to a 5G network (ng-eNB).

5. The method of claim 1, wherein the first network element comprises a source cell, and the second network element comprises a target cell.

6. A method for wireless communication, comprising:
    receiving, by a first network element of a wireless communication network, a paging message comprising a set of paging parameters from a second network element of the wireless communication network via a communication interface, wherein the set of paging parameters comprise a paging time window (PTW), an extended Discontinuous Reception (eDRX) cycle, and a Radio Access Network (RAN) paging cycle, wherein the set of paging parameters comprised in the paging message is used by the first network element for transmitting a paging signal, and wherein the first network element comprises a distributed unit (DU) of a base station, and the second network element comprises a central unit (CU) of the base station; and
    transmitting a paging signal based on the set of paging parameters.

7. The method of claim 6, wherein the base station comprises one of a gNB, or an LTE evolved nodeB capable of connecting to a 5G network (ng-eNB).

8. The method of claim 6, wherein the set of paging parameters further comprise a Core network (CN) UE paging DRX cycle.

9. The method of claim 6, wherein the communication interface comprises at least one of an F1 interface or a W1 interface.

10. The method of claim 6, wherein the first network element comprises a target cell, and the second network element comprises a source cell.

11. A first network element comprising a memory for storing computer instructions and a processor in communication with the memory, wherein, when the processor executes the computer instructions, the processor is configured to cause the first network element to:
    send a paging message comprising a set of paging parameters to a second network element via a communication interface, wherein the set of paging parameters comprise a paging time window (PTW), an extended Discontinuous Reception (eDRX) cycle, and a Radio Access Network (RAN) paging cycle, and wherein the set of paging parameters comprised in the paging message is used by the second network element for transmitting a paging signal, and wherein the first network element comprises a central unit (CU) of a base station, and the second network element comprises a distributed unit (DU) of the base station.

12. The first network element of claim 11, wherein the base station comprises one of a next generation NodeB (gNB), or an LTE evolved nodeB capable of connecting to a 5G network (ng-eNB).

13. The first network element of claim 11, wherein the set of paging parameters further comprise a Core network (CN) UE paging Discontinuous Reception (DRX) cycle.

14. A first network element comprising a memory for storing computer instructions and a processor in communication with the memory, wherein, when the processor executes the computer instructions, the processor is configured to cause the first network element to:

receive a paging message comprising a set of paging parameters from a second network element via a communication interface, wherein the set of paging parameters comprise a paging time window (PTW), an extended Discontinuous Reception (eDRX) cycle, and a Radio Access Network (RAN) paging cycle, wherein the set of paging parameters comprised in the paging message is used by the first network element for transmitting a paging signal, and wherein the first network element comprises a distributed unit (DU) of a base station, and the second network element comprises a central unit (CU) of the base station; and transmit a paging signal based on the set of paging parameters.

15. The first network element of claim 14, wherein the base station comprises one of a gNB, or an LTE evolved nodeB capable of connecting to a 5G network (ng-eNB).

16. The first network element of claim 14, wherein the set of paging parameters further comprise a Core network (CN) UE paging Discontinuous Reception (DRX) cycle.

* * * * *